United States Patent
Machani

(10) Patent No.: US 8,341,712 B2
(45) Date of Patent: Dec. 25, 2012

(54) METHOD AND SYSTEM FOR AUTHENTICATING A USER OF A MOBILE DEVICE

(75) Inventor: Salah E. Machani, Thornhill (CA)

(73) Assignee: Diversinet Corp., Toronto (CA)

( * ) Notice: Subject to any disclaimer, the term of this patent is extended or adjusted under 35 U.S.C. 154(b) by 445 days.

(21) Appl. No.: 12/500,910

(22) Filed: Jul. 10, 2009

(65) Prior Publication Data

US 2010/0287606 A1    Nov. 11, 2010

(30) Foreign Application Priority Data

May 11, 2009    (CA) ...................................... 2665832

(51) Int. Cl.
*G06F 7/04*    (2006.01)

(52) U.S. Cl. ............................................ 726/7; 380/270

(58) Field of Classification Search .................. 380/270; 713/168; 726/7; 709/206; 705/75
See application file for complete search history.

(56) References Cited

U.S. PATENT DOCUMENTS

| | | | |
|---|---|---|---|
| 7,519,986 B2 * | 4/2009 | Singhal | 726/2 |
| 2007/0250632 A1 * | 10/2007 | Nomura et al. | 709/227 |
| 2008/0172341 A1 * | 7/2008 | Crandell | 705/75 |
| 2009/0199286 A1 * | 8/2009 | Singhal | 726/9 |

* cited by examiner

*Primary Examiner* — Samson Lemma
(74) *Attorney, Agent, or Firm* — MacMillan LLP

(57) ABSTRACT

A method and system for authenticating a user of a mobile device is provided. A first message is received from a mobile device, the message including a mobile device identifier identifying said mobile device. An association between the mobile device identifier in the first message and a registered user is confirmed. A second message is generated and transmitted to the mobile device. The second message includes a user identifier identifying the registered user. A request for a service is received, the request including the user identifier.

24 Claims, 3 Drawing Sheets

METHOD AND SYSTEM FOR AUTHENTICATING A USER OF A MOBILE DEVICE

FIELD OF THE INVENTION

The present invention relates to the field of communications. In particular, it relates to a method and system for authenticating a user of a mobile device.

BACKGROUND OF THE INVENTION

Many services require credentials to be provided to authenticate a user's identity before access is provided. For example, in order to access banking services via an automated teller machine, a bank ATM card serves as a first credential and a personal identification number ("PIN") punched in upon being prompted serves as a second credential. By requiring a user to have a strong credential, such as a bank ATM card, the second credential can be weaker. The first credential is only provided to the registered user and the second credential, the PIN, which is also provided to the user separately, authenticates that the person in possession of the card is, in fact, the registered user. Together, the two credentials form a strong form of authentication of identity.

A similar system does not exist for providing services via a web interface for all mobile devices without requiring additional software to be installed on either the mobile device or the subscriber identification module ("SIM").

For purposes of the discussion hereinbelow, mobile devices include mobile telephones, personal digital assistants, and other portable computing devices that have a network communications interface and messaging capabilities associated with a mobile device identifier, such as a telephone number or the like.

There do exist, however, systems for controlling access via mobile devices to web pages that can contain sensitive information or that provide control over accounts, etc., without requiring the installation of additional software on the mobile device or the SIM. When users of mobile devices wish to access web-based services, they open a mobile web browser on the mobile device and either type in the address of a web site or they select a bookmarked address for the web site. For many users, such a process can be confusing, as they do not access this functionality on their mobile devices frequently or as often as other functionality thereof. Further, the entering of a web site address on their mobile device can be difficult, let alone the bookmarking of the web site once the address is entered. Upon hitting "go", the mobile web browser generates a request that is forwarded to the identified address. The request includes the Internet protocol ("IP") address of the mobile device and the page requested. The IP address of the mobile device is generally randomly assigned by the cellular communications provider and cannot, by itself, be relied on to independently authenticate a user. Any information identifying the mobile device's hardware is not passed on. The user is then prompted for login credentials, typically a login name and password. This approach can be problematic for a number of reasons. It requires that the user remember both pieces of information. As a result, many users select easily-remembered and/or short login credentials that are relatively vulnerable to attack. In addition, the input of the login name can be difficult using the input interface of the mobile device. Many mobile devices only have a standard numeric keypad and not an alphanumeric one, and thus require a user to use a multi-tap system or the like to enter in alphabetic characters. As will be appreciated, this is onerous. Further, it can be relatively easy for another person to obtain the user's login credentials.

Another approach is to use the number of a bank card or the like as a credential, which resolves the issue of remembering strong credentials. This, however, presents a new issue in that the card must be retrieved by the user from his wallet. Additionally, as bank card numbers are generally quite long (e.g., 16 digits), their entry can be onerous using the input interface of a mobile device. Further, as possession of the bank card number is sufficient, and actual possession of the bank card is not required, this approach provides relatively weak authentication.

In other scenarios, relatively weak authentication is required for an application but this requires the entry of one or more login credentials by the user.

It is an object of this invention to provide a novel method and system for authenticating a user of a mobile device.

SUMMARY OF THE INVENTION

In an aspect of the invention, there is provided a computerized method for authenticating a user of a mobile device, comprising:
  receiving a first message from a mobile device, said message including a mobile device identifier identifying said mobile device;
  confirming that said mobile device identifier in said first message is associated with a registered user;
  generating and transmitting a second message to said mobile device, said second message including a user identifier identifying said registered user; and
  receiving a request to access a service, said request including said user identifier.

The user identifier can be provided as a credential in the request.

The service can be provided via a web server. The identifier can be a universal resource identifier ("URI") identifying the address of the web page and that is unique for said registered user. The web page can be a login web page. The method can further include transmitting the login web page to the mobile device. Additionally, the method can include receiving a login request from the mobile device generated using the login web page, the login request including at least one login credential entered by the registered user on the mobile device. Further, the method can include transmitting an access-controlled web page to the mobile device if the at least one login credential is authenticated. The at least one login credential can include a login name, a password and/or a response to a challenge question.

The user identifier can be a credential provided as a parameter in the URI identifying the address of the web page. The credential and/or web page can expire if not used within a specified time period. The message can be a short message service ("SMS") message and the mobile device identifier can be a telephone number.

The method can include, before the receiving of a first message:
  receiving a registration request from said user via a registration web page, said registration request specifying said telephone number of said mobile device operated by said user; and
  transmitting an SMS message to said telephone number from an SMS server to provide an access telephone number of said SMS server to said user.

The registration request can include at least one login credential for the registered user. The at least one login credential can include a password, a login name and/or a response to a challenge question.

In another aspect of the invention, there is provided a system for authenticating a user of a mobile device, comprising:

a user database storing a mobile device identifier for registered users of a service;

a server for receiving a first message from a mobile device, said message including a mobile device identifier identifying said mobile device, and for generating and transmitting a second message to said mobile device if said mobile device identifier is associated with one of said registered users in said user database, said second message including a user identifier identifying said one registered user; and a server receiving a request for a service, said request including said user identifier.

The server can be a web server. The identifier can be a URI identifying the address of the web page and that is unique to the registered user.

The web page can be a login web page. The web server can transmit an access-controlled web page to the mobile device in response to receiving a login request from the mobile device generated using the login web page, the login request including at least one login credential entered by the one registered user of the mobile device. The at least one login credential can include a password, a login name and/or a response to a challenge question.

The user identifier can be provided as a credential in the request. The credential can be included as a parameter of a URI identifying the address of the service. The credential and/or the web page can expire if not used within a specified time period.

The mobile device identifier can be a telephone number and the message can be an SMS message. The web server can receive a registration request from the user via a registration web page, the registration request specifying the mobile device identifier of the mobile device operated by the user, and, in response, the server can transmit a message to the mobile device associated with the mobile device identifier from the system to provide an address of the system to the user.

As the first credential (i.e., the mobile device identifier, which is effectively a hardware token) is relatively strong, additional credentials may not be required or can be relatively weak. Accordingly, the additional credentials may be shorter and/or numeric characters, facilitating memorization and entry by the user.

Other and further advantages and features of the invention will be apparent to those skilled in the art from the following detailed description thereof, taken in conjunction with the accompanying drawings.

BRIEF DESCRIPTION OF THE DRAWINGS

An embodiment will now be described, by way of example only, with reference to the attached Figures, wherein.

DETAILED DESCRIPTION OF THE EMBODIMENT

The invention relates to a method and system for authenticating a user of a mobile device. By confining that a mobile device identifier identified in a received message is associated with a registered user via a first channel, and by sending a second message to the mobile device identified by the mobile device identifier that includes a user identifier identifying the registered user, additional authentication of the registered user performed via a second channel can be combined with and further strengthened by the initial authentication. In the embodiment described below, the initial message exchange is performed via short message service ("SMS"), the system being able to authenticate the user via the telephone number of the mobile device identified in the initial SMS message. In the response SMS message from the system, the user identifier is provided as a universal resource identifier ("URI") that the user clicks on to generate a request for a type of service; in this case, a web page. The URI is unique for that user, and can be unique for that session and/or can be set to expire if not used within a period of time. By activating the URI provided in the second SMS message, the user can be taken to a web page to provide login credentials, if desired. The pass back of the user identity via the URI enables the system to combine the initial authentication with a subsequent authentication. Further authentication can be performed by directing the user to a login page via the URI, where the registered user is directed to enter in one or more further credentials.

Figure 1:
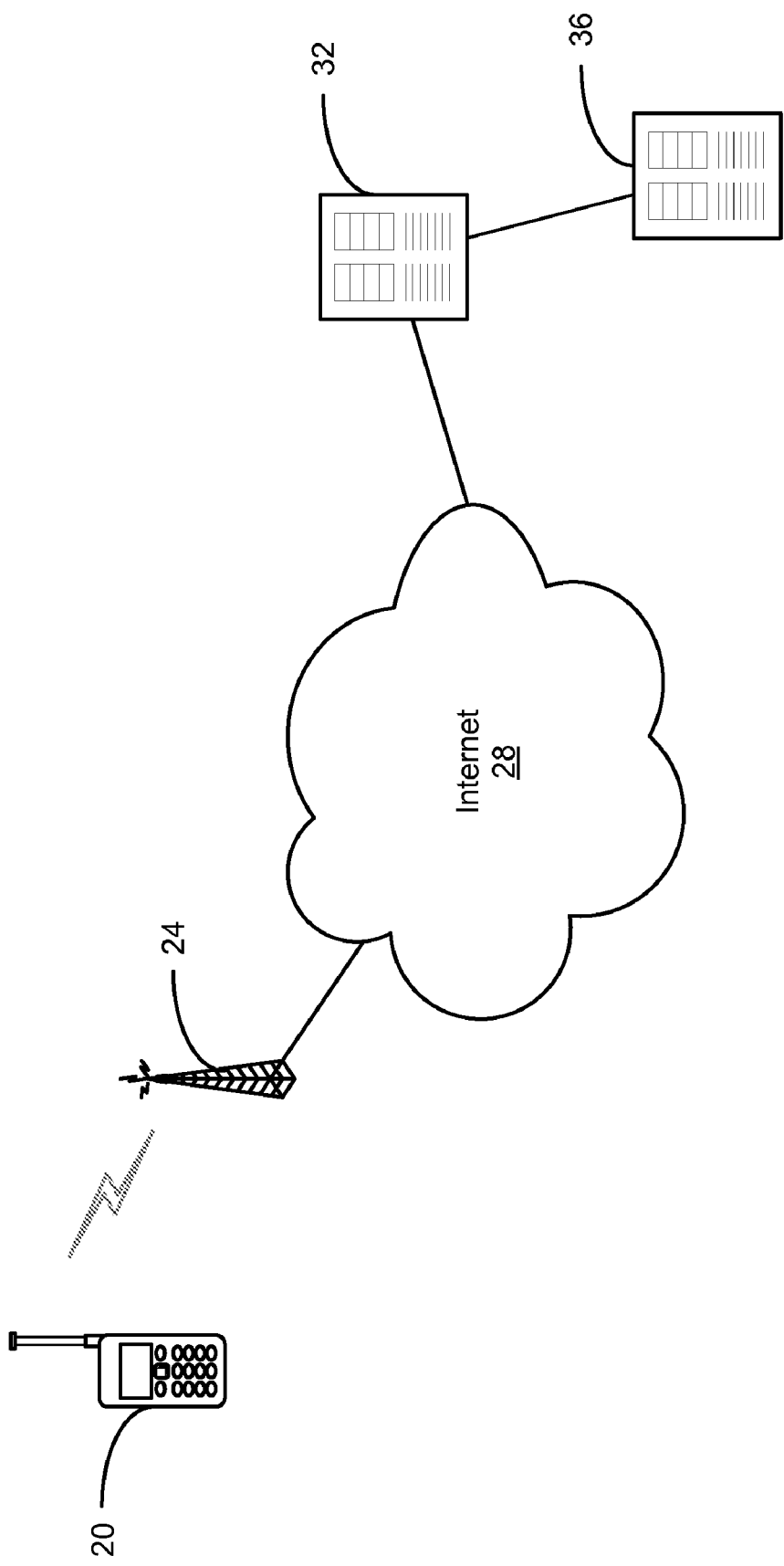
FIG. 1 is a schematic diagram of a system for authenticating a user of a mobile device and its operating environment in accordance with an embodiment of the invention.

A system for authenticating a user of a mobile device and its operating environment in accordance with an embodiment of the invention is shown in FIG. 1. The mobile device 20 is in communication wirelessly with a cellular base station 24 via cellular communications. The cellular base station 24 is in communication with a large, public network, such as the Internet 28 via a number of intermediate servers and switches, such as those of a cellular communications provider (not shown).

The mobile device 20 has an address book for contacts of a user of the mobile device, and the ability to send and receive SMS messages. In addition, the mobile device 20 includes a mobile web browser, such as a wireless application protocol ("WAP") browser or the like. The mobile device 20 is soft-coded with a telephone number that serves as a mobile device identifier.

A system 32 for authenticating a user of a mobile device is also in communication with the Internet 28. The system 32 is a large server that performs a variety of functions. The system 32 includes an SMS application that allows the system 32 to act as an SMS server. Additionally, the system 32 includes a web server application that allows the system 32 to act as a web server. The web server application provides a service, which permits banking to be done via a mobile web browser. The system 32 is connected to a bank gateway 36 that provides access to banking functionality. Further, the system 32 maintains a user database in which the telephone numbers of mobile devices operated by users are registered, along with a password for each user.

In order to use the banking functionality provided by the system 32, a user opts in and registers, for example, online with the system 32 via a registration web page using a personal computer. During registration, the user provides the telephone number of the mobile device 20 with which he would like to access the service, along with a login credential.

In the described embodiment, the login credential is a password. The system 32 sends the mobile device 20, via the telephone number, an SMS message requesting user confirmation and provides instructions to the user on how to use the service. The datagram for the SMS message includes the service short code/access telephone number of the sender (i.e., the system 32), thus enabling reply to the SMS message. The user is directed to simply respond to the SMS message to confirm. The instructions provided in the confirmatory SMS message direct the user to add the sender of the SMS message to his address book.

Figure 2:
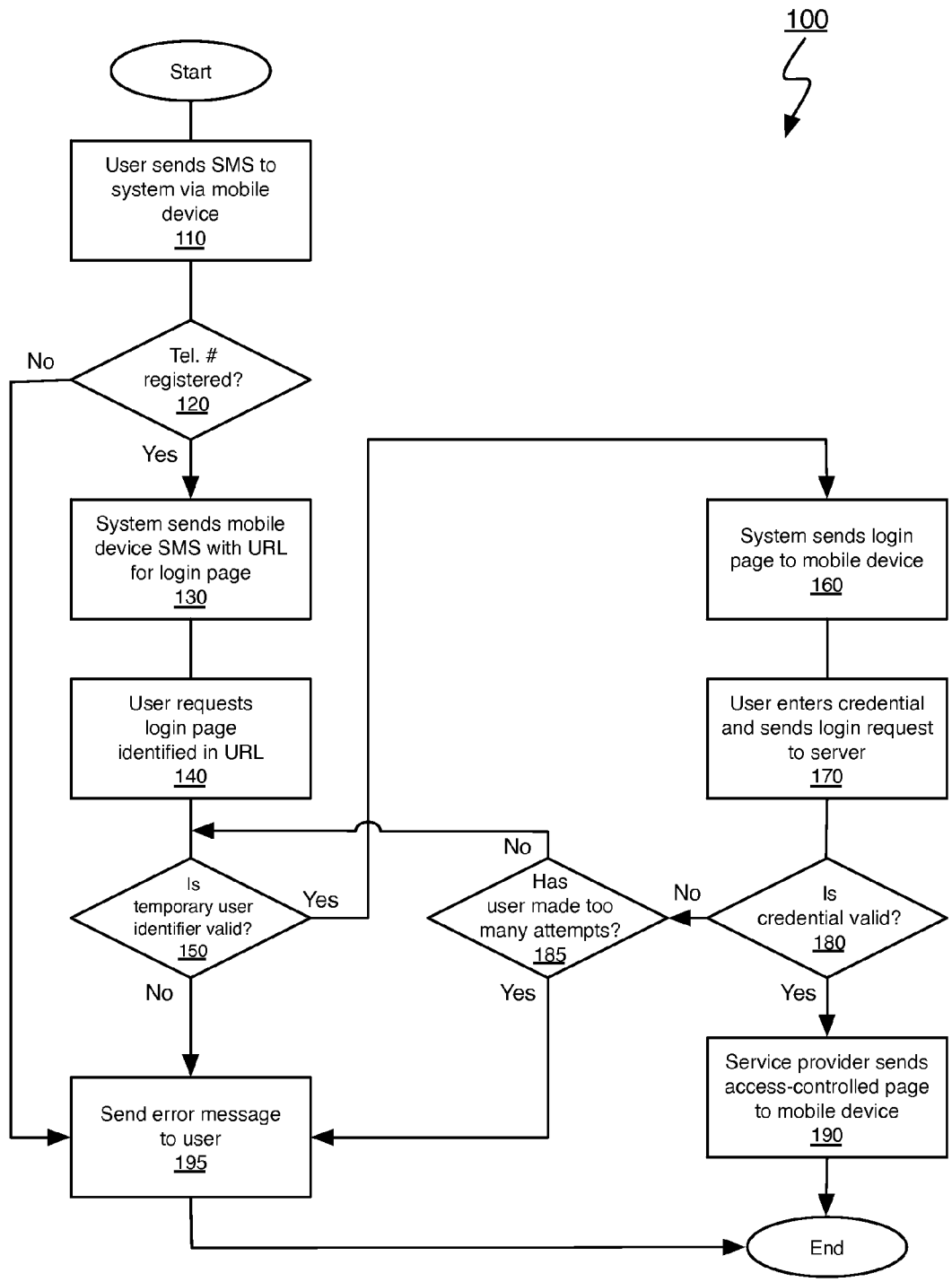
FIG. 2 shows a flowchart of the general method used by the system of FIG. 1 for authenticating a user of a mobile device.

FIG. 2 shows the method of authenticating a user of a mobile device used by the system 32 generally at 100.

Figure 3:
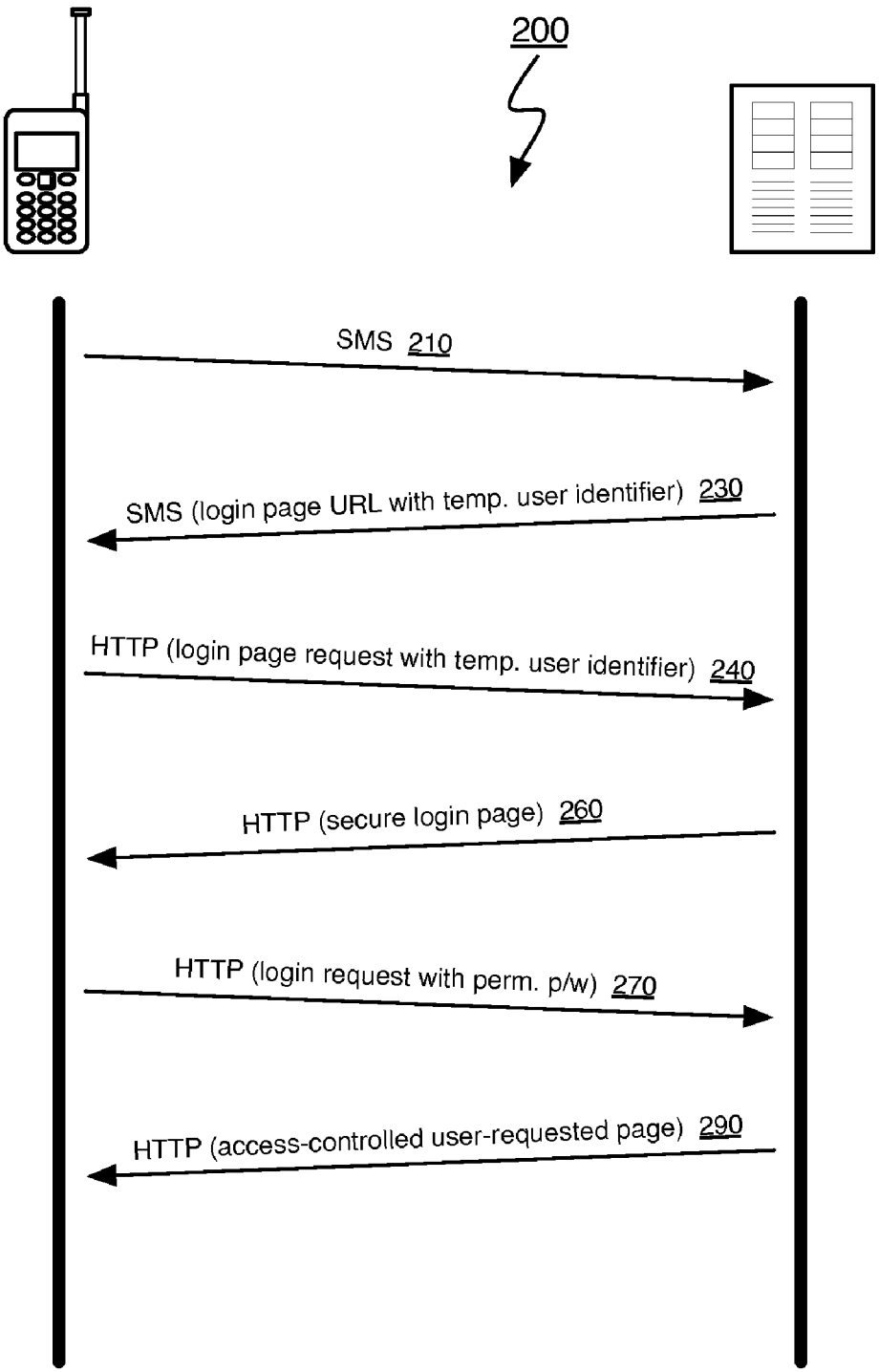
FIG. 3 shows a sequence of communications between a mobile device and the system of FIG. 1 for authenticating a user of a mobile device.

FIG. 3 shows the communication exchange between the mobile device 20 and the system 32 during the authentication generally at 200.

The method of authenticating a user of a mobile device will now be described with reference to both FIGS. 2 and 3. The method commences with the user sending an SMS to the system 32 (step 110 and communication 210). The user opens the address book on his mobile device 20 and selects the address for the system 32 as an addressee for an SMS message. The body text of the SMS message is irrelevant. The SMS message is transmitted via the cellular base station 24 and the Internet 28 to the system 32.

Once the system 32 receives the SMS message, it parses the message to extract the telephone number of the sender and looks up the telephone number in the user database to determine if it is registered (step 120). If the telephone number is registered, the system 32 sends an SMS message to the user's mobile device 20 with the universal resource locator ("URL") for a login web page, including a temporary user identifier (step 130 and communication 230). URLs are URIs wherein they identify a resource by location, in contrast to universal resource names ("URNs") that identify resources by name. The URL is prefaced with the tag /URL that indicates to the mobile device that the text following it is a hyperlink to a web page. For example, the SMS message could contain the following text: "https://bank.com/?passkey=1361672674", without quotes. When the SMS message is presented on the mobile device 20, the URI appears as hyperlinked text. The passkey acts as the temporary user identifier that is generated by the system 32 and registered in a temporary user identifier store, along with the identity of the registered user associated with the telephone number of the mobile device, and the date and time it was generated at. The temporary user identifier is provided as a parameter in the URL, denoted by the fact that it follows the question mark. As a result, the text "https://bank.com/?passkey=1361672674", when taken as a whole, represents a temporary web page. Once the SMS message from the system 20 is received by the mobile device 20 and opened by the user, selection and activation of the URL opens a mobile web browser session on the mobile device 20. The browser sends a request to the system 32 for the login page, along with the temporary user identifier as a parameter (i.e., it requests "//bank.com/?passkey=1361672674") (step 140 and communication 240). The request is not sent via SMS, but instead via TCP/IP data communications. As a result, the request does not include the telephone number of the mobile device 20, but, instead, includes an IP address temporarily assigned to the mobile device 20 by the cellular communications provider.

Upon receipt of the login page request, the system 32 looks up the temporary user identifier in the temporary user identifier store and its date and time of generation to determine whether the temporary user identifier is valid (step 150). Temporary user identifiers are granted a lifetime of two minutes by the system 32. If the temporary user identifier is in the temporary user identifier store and has not yet expired, the system 32 transmits the requested login page to the mobile device 20 (step 160 and communication 260). The login page is received by the mobile device 20 and rendered by its mobile web browser. The login page prompts the user for the login credential (i.e., the password) he provided during registration with the service. Upon entering in his password in the password field of the login page and selecting and activating an "Ok" button, the mobile device 20 sends a login request to the system 32 (step 170 and communication 270). Upon receiving the login request from the mobile device 20, the system 32 compares the password provided with the login request to the password stored in the user database for the user associated with the web session to determine if the password is valid (step 180).

If the password is determined to be valid by the system 32, the system 32 sends an access controlled page to the mobile device 20 with a menu for performing various banking functions (step 190 and communication 290). At this point, the method ends. The user has been connected to the web site/page that provides the desired functionality/services.

If, instead, the password is determined to be invalid at step 180, it is determined whether the user has exceeded a pre-defined limit on the number of failed login attempts (step 185). If the user has not exceeded the pre-defined limit on the number of failed login attempts, the system 32 checks if the temporary user identifier is still valid at step 150 before resending the login page to the mobile device 20 at step 160.

If the user is determined to have exceeded the pre-defined limit on the number of failed login attempts at step 185, or if the telephone number is determined to not be in the user database at step 120, or if the temporary password is determined to be invalid at step 150, the system 32 sends an error message to the user (step 195). The error message is sent by the system 32 via SMS, unless the error message is generated as a result of exceeding the pre-defined limit on the number of login requests, in which case, the system 32 sends the mobile device 20 a web page with an appropriate error message.

While the above embodiment of the invention has been described as including additional steps to obtain a second credential for authenticating a user, it will be appreciated that the method can still provide a level of authentication without obtaining the second credential. Further, more than one additional credential can be obtained to further strengthen the authentication. For example, the login page can request that a user enter in a login name and password. While this approach entails additional text entry by the user, it does provide a greater level of authentication.

Other forms of credentials can be used in combination with the mobile device authentication provided via the SMS and initial web page request exchange. For example, during registration with the service, the user can establish a set of challenge questions and responses that can then be used later to verify his identity.

Unique web pages can be generated for each incoming SMS message, for example, thus negating the need for parameters. Further, the unique web pages can be set to be valid only for a specified time period to provide additional security.

Other combinations of message types that bear hardware identifiers can be used for the initial exchange. For example, the system can, upon receiving an SMS message from a mobile device, respond with another message type, such as a RIM® Blackberry® PIN message or a WAP push message. In another example, the exchange can be initiated via a voice call placed from the mobile device to the system, and the system can transmit an SMS message in response.

Other forms of temporary web pages can be provided. For example, the URL "https://bank.com/login/?ref=54444A6F90455ADB&OTP=645445" can be used, wherein "ref" is a parameter for identifying the device (and thus the user to which that device is registered), and OTP represents the one-time password (i.e., the temporary access code).

While the system was described in the embodiment as using the user identifier for providing access to a web service (i.e., web pages), other types of services can be accessed using the user identifier. For example, a URI can be provided in the second message from the system to the mobile device identifying a file transfer protocol address and the user identifier can serve as a login credential.

The user identifier provided to the user can be associated with subsequent communications between the mobile device and the server in other ways. For example, the identifier can be a plain text string that can be cut and pasted, or entered in manually, into a login page or the like. The user identifier can be used on a device other than the mobile device. For example, once the user identifier is received, it can be entered into an application, such as a web browser, executing on a personal computer.

The system that executes the method can be a single physical computer, a number of computers coupled together locally to provide the desired functionality or a number of distributed computers that perform the same functionality.

Other protocols and extensible mark-up language formats can be used in place of hypertext transport protocol and hypertext mark-up language, such as wireless access protocol ("WAP") and wireless mark-up language ("WML").

The above-described embodiments are intended to be examples of the present invention and alterations and modifications may be effected thereto, by those of skill in the art, without departing from the scope of the invention which is defined solely by the claims appended hereto.

What is claimed is:

1. A computerized method for authenticating a user of a mobile device, comprising:
   receiving a first message from a mobile device, said message including a mobile device identifier identifying said mobile device;
   confirming that said mobile device identifier in said first message is associated with a registered user;
   generating and transmitting a second message to said mobile device, said second message including a universal resource identifier ("URI") that serves as a user identifier identifying said registered user; and
   receiving a request to access a service via said URI.

2. The method of claim 1, wherein said user identifier is provided as a credential in said request.

3. The method of claim 1, wherein said service is provided via a web server computer system.

4. The method of claim 3, wherein said URI identifies the address of said web page that is unique to said registered user.

5. The method of claim 3, wherein said web page is a login web page.

6. The method of claim 5, further comprising:
   transmitting said login web page to said mobile device.

7. The method of claim 6, further comprising:
   receiving a login request from said mobile device generated using said login web page, said login request including at least one login credential entered by said registered user on said mobile device.

8. The method of claim 7, further comprising:
   transmitting an access-controlled web page to said mobile device if said at least one login credential is authenticated.

9. The method of claim 1, wherein said user identifier is a credential provided as a parameter in said URI identifying the address of said web page.

10. The method of claim 2, wherein said credential expires if not used within a specified time period.

11. The method of claim 4, wherein said web page expires if not used within a specified time period.

12. The method of claim 1, wherein said first message is a short message service ("SMS") message and said mobile device identifier is a telephone number.

13. The method of claim 12, further comprising, before said receiving a first message:
   receiving a registration request from said user via a registration web page, said registration request specifying said telephone number of said mobile device operated by said user; and
   transmitting an SMS message to said telephone number from an SMS server to provide an access telephone number of said SMS server to said user.

14. A system for authenticating a user of a mobile device, comprising:
   a server computer system storing a user database in storage, said user database storing a mobile device identifier for registered users of a service, said server computer system receiving a first message from a mobile device, said message including a mobile device identifier identifying said mobile device, and generating and transmitting a second message to said mobile device if said mobile device identifier is associated with one of said registered users in said user database, said second message including a universal resource identifier ("URI") at which a service is available and that serves as a user identifier identifying said one registered user.

15. The system of claim 14, wherein said service is provided by a web server computer system.

16. The system of claim 15, wherein said URI identifies the address of said web page that is unique to said registered user.

17. The system of claim 16, wherein said web page is a login web page.

18. The system of claim 17, wherein said web server computer system transmits an access-controlled web page to said mobile device in response to receiving a login request from said mobile device generated using said login web page, said login request including at least one login credential entered by said one registered user of said mobile device.

19. The system of claim 14, wherein said user identifier is provided as a credential in said request.

20. The system of claim 19, wherein said credential is included as a parameter of a URI identifying the address of the service.

21. The system of claim 19, wherein said credential expires if not used within a specified time period.

22. The system of claim 16, wherein said web page expires if not used within a specified time period.

23. The system of claim 14, wherein said mobile device identifier is a telephone number and said message is an SMS message.

24. The system of claim 14, wherein said web server computer system receives a registration request from said user via a registration web page, said registration request specifying said mobile device identifier of said mobile device operated by said user, and, in response, said server computer system transmits a message to said mobile device associated with said mobile device identifier from said system to provide an address of said system to said user.

* * * * *